United States Patent
Sekino et al.

(10) Patent No.: US 9,969,347 B2
(45) Date of Patent: May 15, 2018

(54) AIRBAG DEVICE

(71) Applicant: ASHIMORI INDUSTRY CO., LTD., Osaka-shi, Osaka (JP)

(72) Inventors: Tadaaki Sekino, Osaka (JP); Keita Yamauchi, Osaka (JP); Yushi Yoshida, Osaka (JP)

(73) Assignee: ASHIMORI INDUSTRY CO., LTD., Osaka-shi, Osaka (JP)

( * ) Notice: Subject to any disclaimer, the term of this patent is extended or adjusted under 35 U.S.C. 154(b) by 0 days. days.

(21) Appl. No.: 15/374,560

(22) Filed: Dec. 9, 2016

(65) Prior Publication Data
US 2017/0166157 A1    Jun. 15, 2017

(30) Foreign Application Priority Data
Dec. 10, 2015   (JP) .................................. 2015-241009

(51) Int. Cl.
*B60R 21/217*    (2011.01)

(52) U.S. Cl.
CPC ........ *B60R 21/2171* (2013.01); *B60R 21/217* (2013.01); *B60Y 2306/01* (2013.01)

(58) Field of Classification Search
CPC ........................ B60R 21/2171; B60R 21/217
USPC ....................................................... 280/731
See application file for complete search history.

(56) References Cited

U.S. PATENT DOCUMENTS

| | | | | |
|---|---|---|---|---|
| 5,577,763 A * | 11/1996 | Cuevas | ................. | B60R 21/217 280/728.2 |
| 6,113,134 A * | 9/2000 | Lim | ...................... | B60R 21/217 180/282 |
| 6,398,255 B1 * | 6/2002 | Scherzinger | ........... | B60Q 5/003 280/728.1 |
| 6,409,209 B2 * | 6/2002 | Amamori | .............. | B60R 21/233 280/728.2 |
| 7,497,468 B2 * | 3/2009 | Choi | ..................... | B60R 21/217 280/740 |
| 8,215,663 B2 * | 7/2012 | Shimazaki | ............ | B60R 21/201 280/728.2 |
| 2011/0062688 A1 * | 3/2011 | Hayashi | ............ | B60R 21/21656 280/728.3 |

FOREIGN PATENT DOCUMENTS

JP         2001301560 A    10/2001

* cited by examiner

*Primary Examiner* — Faye M Fleming
(74) *Attorney, Agent, or Firm* — Alleman Hall Creasman & Tuttle LLP

(57) ABSTRACT

An airbag device comprises a mounting plate and a retaining member, the mounting plate includes a housing portion which houses therein a part of an inflator, the retaining member includes a fixing portion fixed to the mounting plate at a location that is radially outward relative to the side surface of the inflator, a leg portion which has a first end portion provided continuously with the fixing portion, and extends from the first end portion toward the top surface of the inflator in the center axis direction, and an arm portion extending radially inward relative to the side surface from the second end portion of the leg portion, and the retaining member is in contact with a part of the inflator and is elastically deformed to retain the inflator in the housing portion, in a state in which the fixing portion is fixed to the mounting plate.

7 Claims, 11 Drawing Sheets

AIRBAG DEVICE

CROSS-REFERENCE TO THE RELATED APPLICATION

This application claims priority to and the benefit of Japanese Patent Application No. 2015-241009 filed on Dec. 10, 2015, the entire disclosure of which is incorporated herein by reference.

BACKGROUND OF THE INVENTION

Field of the Invention

The present invention relates to an airbag device.

Description of the Related Art

Conventionally, in an airbag device including a cylindrical inflator, the inflator with a flange is provided to a bracket (mounting plate) for supporting the inflator, and is mounted on the mounting plate via the flange by fastening members or the like. In contrast, in order to save the trouble of having to mount the flange on the inflator, and more flexibly design a structure for supporting the inflator on the mounting plate, a configuration for supporting on the mounting plate the inflator which is not provided with the flange has been proposed.

For example, Japanese Laid-Open Patent Application Publication No. 2001-301560 discloses a configuration in which a pressing portion for pressing the side surface and top surface of the inflator is fixed to a retainer (mounting plate) formed with a housing portion for housing the inflator therein. This pressing portion allows the inflator to be supported on the housing portion of the retainer.

In the above-described configuration, in order to firmly support the inflator on the housing portion of the retainer, it is necessary to increase design accuracy of the inflator with respect to the retainer and the pressing portion, namely, reduce an assembling error between the inflator, and the retainer and the pressing portion. For example, if the inner diameter of the retainer or the pressing portion is larger than the outer diameter of the inflator, the inflator is displaced and is not firmly supported on the housing portion. To avoid this, the inner diameter of the retainer or the pressing portion may be designed to be smaller than the outer diameter of the inflator. However, in this design, it becomes difficult to mount the inflator on the retainer, or the retainer or the pressing portion may press the inflator excessively after the inflator is mounted on the retainer. If the inflator is pressed excessively by the retainer or the pressing portion in this way, there is a possibility that correct actuation of the inflator cannot be secured.

The present invention has been developed to solve the above-described problem, and an object of the present invention is to provide an airbag device which is capable of properly mounting an inflator without increasing accuracy of constituent members.

SUMMARY OF THE INVENTION

To achieve the above-described object, according to an aspect of the present invention, an airbag device comprises an airbag having an opening; a cylindrical inflator; a mounting plate which has a mounting plane on which the airbag is mounted and supports the inflator in such a manner that a center axis of the inflator is perpendicular to the mounting plane to insert at least a part of the inflator into the airbag through the opening, in a state in which the airbag is mounted on the mounting plane; and a retaining member which is fixed to the mounting plate and is elastically deformable, wherein the mounting plate includes a housing portion which houses therein a part of the inflator, wherein the inflator has a bottom surface disposed to be close to the housing portion, a top surface opposite to the bottom surface, and a side surface provided continuously with the bottom surface and the top surface, wherein the retaining member includes: a fixing portion fixed to the mounting plate at a location that is radially outward relative to the side surface of the inflator, a leg portion which has a first end portion provided continuously with the fixing portion, and a second end portion, and extends from the first end portion toward the top surface of the inflator in a center axis direction of the inflator, and an arm portion extending radially inward relative to the side surface of the inflator from the second end portion of the leg portion, and wherein the retaining member is in contact with a part of the inflator and is elastically deformed to retain the inflator in the housing portion of the mounting portion, in a state in which the fixing portion is fixed to the mounting plate.

In accordance with this configuration, the retaining member is fixed to the mounting plate in a state in which the bottom surface of the inflator is supported on the housing portion of the mounting plate, and thereby is elastically deformed. By an elastic force (resilience) generated by the elastic deformation of the retaining member, the inflator is retained in the housing portion. Therefore, it becomes possible to suppress the retaining member from pressing the inflator excessively, while preventing a displacement of the inflator with respect to the retaining member and the mounting plate in a state in which the inflator is mounted on the mounting plate. This makes it possible to properly mount the inflator on the mounting plate, without increasing accuracy of the constituent members of the inflator, the retaining member, and the mounting plate.

In the airbag device, at least a part of the arm portion of the inflator may protrude toward the top surface of the inflator, and a protruding portion of the arm portion may be in contact with the top surface of the inflator in a state in which the fixing portion of the retaining member is fixed to the mounting plate. In accordance with this configuration, the protruding portion of the arm portion of the retaining member presses the top surface of the inflator by the elastic deformation of the retaining member, and thus the inflator is retained between the arm portion of the retaining member and the housing portion of the mounting plate. At this time, by the elastic deformation of the retaining member, an error (difference) between a distance from the protruding portion of the arm portion to the bottom surface of the housing portion, and the length of the inflator in the center axis direction is corrected. Therefore, it becomes possible to effectively prevent a displacement of the inflator in a vertical direction (center axis direction of the inflator) in a state in which the inflator is mounted on the mounting plate.

In the airbag device, the protruding portion of the arm portion may have a flat surface shape to be in surface contact with the top surface of the inflator. In accordance with this configuration, since the retaining member is in surface contact with the top surface of the inflator, it becomes possible to more effectively suppress a local increase in a pressing force applied by the retaining member which is in contact with the inflator.

In the airbag device, the leg portion may include at least two leg portions, and the leg portions may be coupled to each other by the arm portion. Since the at least two leg portions are coupled to each other by the arm portion, the elastic force generated by the elastic deformation of the retaining member can work effectively to retain the inflator.

In the airbag device, the top surface of the inflator may be configured to swell outward in the center axis direction of the inflator so as to have a predetermined curved shape when the inflator is activated, and the arm portion may have a length which does not affect formation of the predetermined curved shape. In this configuration, when the inflator is activated, it becomes possible to prevent the arm portion of the retaining member from affecting a change in the shape of the top surface of the inflator (the top surface of the swollen inflator). This makes it possible to secure the correct actuation of the inflator, and continue to retain the inflator by the retaining member, when the inflator is activated and after the inflator is activated.

In the airbag device, the leg portion may include at least two leg portions, and the fixing portion includes fixing portions independently provided at the leg portions, respectively. In this configuration, since the fixing portions are not coupled to each other, the retaining member can be easily elastically deformed when the retaining member is fixed to the mounting plate. Therefore, an assembling work can be easily performed.

In the airbag device, the leg portion may include at least two leg portions, and the fixing portion may include fixing portions provided at the leg portions, respectively, the arm portion of the retaining member may be configured to contact the top surface of the inflator to cause a force applied radially inward of the inflator to be generated in the leg portions, and the leg portions may be configured to contact the side surface of the inflator in a state in which the fixing portions are fixed to the mounting plate.

In accordance with this configuration, by the elastic deformation of the retaining member, the arm portion of the retaining member comes into contact with the top surface of the inflator, and thereby a force for moving the leg portions of the retaining member radially inward of the inflator is generated. With this force, the leg portions of the retaining member come into contact with the side surface of the inflator, and thereby the elastic force for pressing the side surface of the inflator by the leg portions is generated in the retaining member. The inflator is retained between the leg portions of the retaining member fixed to the mounting plate. At this time, by the elastic deformation of the retaining member, an error (difference) between a distance from each of the leg portions to the center axis of the inflator, and the radius of the inflator at a location where the leg portion of the retaining member is in contact with the inflator is corrected. Therefore, it becomes possible to effectively prevent a displacement of the inflator in the vertical direction and in the rightward and leftward direction (radial direction of the inflator), in a state in which the inflator is mounted on the mounting plate.

In accordance with the above-described configuration, it becomes possible to obtain an advantage that the inflator can be properly mounted without increasing accuracy of constituent members.

The above and further objects, features and advantages of the present invention will more fully be apparent from the following detailed description of the preferred embodiments with reference to accompanying drawings.

DETAILED DESCRIPTION OF THE EMBODIMENTS

Hereinafter, the embodiments of the present invention will be described with reference to the accompanying drawings. Throughout the drawings, the same or corresponding constituents are designated by the same reference symbols and will not be described repeatedly.

Embodiment 1

Figure 1:
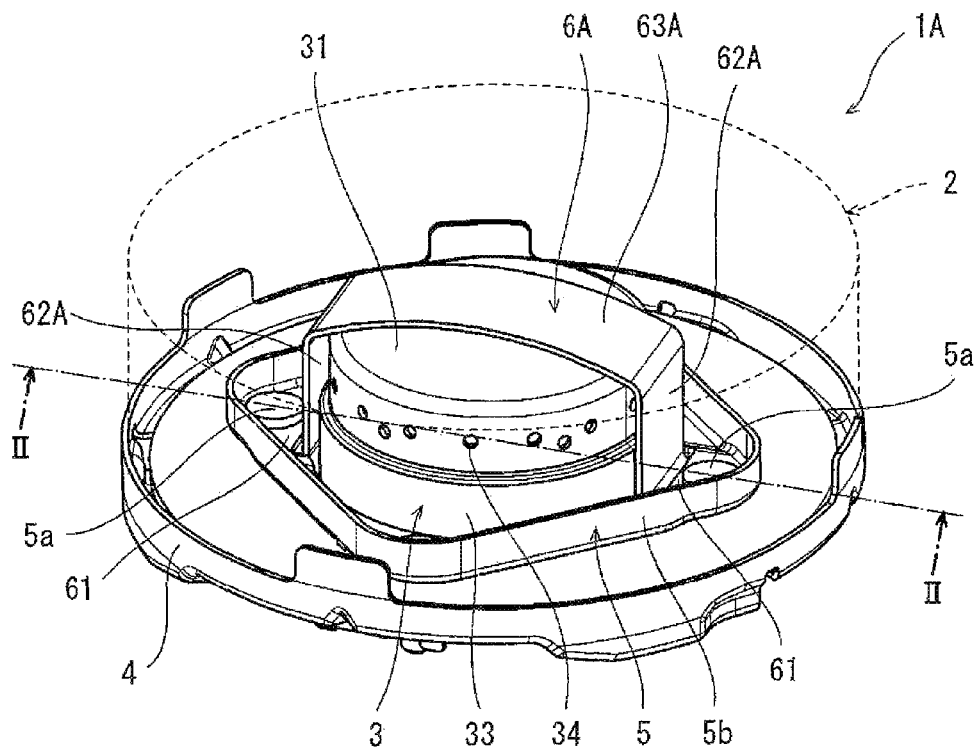
FIG. 1 is a perspective view showing the schematic configuration of an airbag device according to Embodiment 1 of the present invention.
Figure 2:
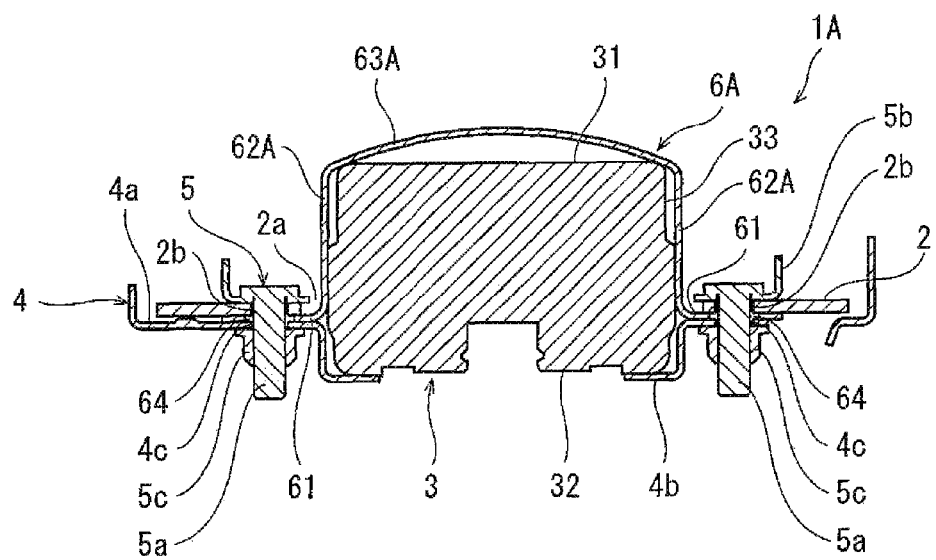
FIG. 2 is a cross-sectional view showing the airbag device of FIG. 1, taken in the direction of arrows along line II-II of FIG. 1.
Figure 3:
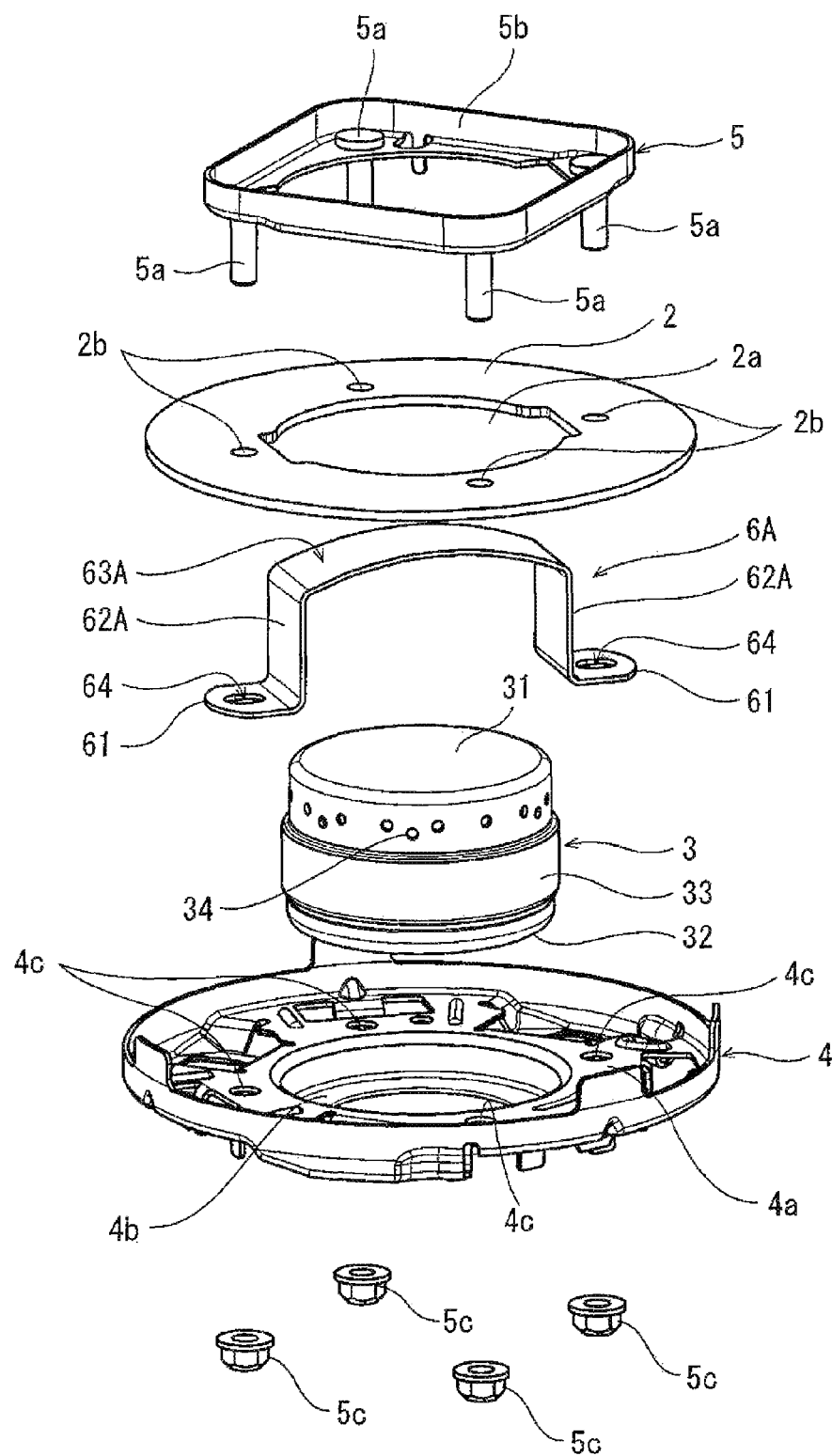
FIG. 3 is an exploded perspective view showing the airbag device of FIG. 1.

FIG. 1 is a perspective view showing the schematic configuration of an airbag device 1A according to Embodiment 1 of the present invention. FIG. 2 is a cross-sectional view showing the airbag device 1A of FIG. 1, taken in the direction of arrows along line II-II of FIG. 1. FIG. 3 is an exploded perspective view showing the airbag device 1A of FIG. 1. As shown in FIGS. 1 to 3, the airbag device 1A according to the present embodiment includes an airbag 2 having an opening 2a, a cylindrical inflator 3, and a mounting plate 4 having a mounting plane 4a on which the airbag 2 is mounted. The airbag 2 is a bag-shaped member. In FIG. 1, the outer shape of the airbag 2 in a folded state is indicated by a broken line. In FIGS. 2 and 3, the opening 2a of the airbag 2 and only a part of the airbag 2 which is formed with a plurality of bolt insertion holes 2b (which will be described later) are shown.

The inflator 3 includes a cylindrical side surface 33, a top surface 31, and a bottom surface 32 in such a manner that the top surface 31 and the bottom surface 32 are provided on both ends of the side surface 33 and opposed each other. The side surface 33 is formed with a plurality of gas discharge holes 34 which discharge a gas to inflate and deploy the airbag 2. In the present embodiment, a part of the side surface 33 which is closer to the top surface 31 in the center axis direction of the inflator 3 has a diameter smaller than the largest diameter of the side surface 33. In this part, the plurality of gas discharge holes 34 are formed. A gas generation agent is housed within the inflator 3. Although not shown, a connector for signal transmission is connected to the center portion of the bottom surface 32 of the inflator 3, and the gas generation agent is combusted in response to an electric signal externally applied and transmitted through the connector. Thereby, the gas is generated, and discharged through the plurality of gas discharge holes 34.

The mounting plate 4 includes a housing portion 4b which houses therein a part of the inflator 3. In the present embodiment, the center portion of the mounting plate 4 is recessed toward the opposite surface side of the mounting plane 4a to conform in shape to the side surface 33 and the bottom surface 32 of the inflator 3. This recessed portion is the housing portion 4b.

The inflator 3 is supported by the housing portion 4b in such a manner that a center axis thereof (axis connecting the center point of the top surface 31 to the center point of the bottom surface 32) is perpendicular to the mounting plane 4a. The bottom surface 32 of the inflator 3 is disposed to be close to the housing portion 4b. In this state, when the airbag 2 is mounted on the mounting plane 4a, at least a part of the inflator 3 is inserted into the inside of the airbag 2 through the opening 2a of the airbag 2. In the present embodiment, the top surface 31 and a part of the side surface 33 are inserted into the inside of the airbag 2 in such a manner that the plurality of gas discharge holes 34 are located in the inside of the airbag 2. In this configuration, when the gas is discharged through the gas discharge holes 34, the airbag 2 is inflated and deployed.

The airbag 2 is mounted on the mounting plane 4a by use of fastening members or the like. In the present embodiment, the mounting plane 4a is provided with four mounting holes 4c at equal intervals in the circumferential direction of the housing portion 4b. In other words, the four mounting holes 4c are provided in such a manner that the four mounting holes 4c are the apexes of a square shape and the intersection of diagonal lines of the square shape conforms to the center axis of the inflator 3. The airbag 2 is provided with four bolt insertion holes 2b corresponding to the four mounting holes 4c, respectively. Bolts 5a are inserted into the bolt insertion holes 2b and the mounting holes 4c, respectively. The airbag 2 is fixed to the mounting plate 4 in such a manner that nuts 5c are fastened to the four bolts 5a, respectively, protruding from the opposite surface side of the mounting plane 4a. The four bolts 5a are fixed to one plate member 5b in advance. In other words, the airbag 2 is mounted on the mounting plate 4 by use of a clamping member 5 with the four bolts 5a fixed to the plate member 5b.

The airbag device 1A includes a retaining member 6A for retaining the inflator 3 in the housing portion 4b of the mounting plate 4. The retaining member 6A is elastically deformable and fixed to the mounting plate 4.

The retaining member 6A includes fixing portions 61 fixed to the mounting plate 4 at locations that are radially outward relative to the side surface 33 of the inflator 3, leg portions 62A which have first end portions provided continuously with the fixing portions 61, respectively, and second end portions, and extend from the first end portions to the top surface side of the inflator 3 in the center axis direction (the top surface 31 side along the side surface 33), and an arm portion 63A extending radially inward relative to the side surface 33 from the second end portions of the leg portions 62A. In the present embodiment, two fixing portions 61 and two leg portions 62A are provided. The two leg portions 62A are coupled to each other by the arm portion 63A. The retaining member 6A is formed by bending one metal plate.

In the present embodiment, the retaining member 6A is fixed to the mounting plate 4 at the fixing portions 61, together with the airbag 2, by the clamping member 5 used to mount the airbag 2 on the mounting plate 4. To this end, the fixing portions 61 of the retaining member 6A are provided with mounting holes 64, respectively, into which the bolts 5a of the clamping member 5 are inserted.

Now, the steps of assembling the airbag device 1A according to the present embodiment will be described. Initially, the four bolts 5a of the clamping member 5 are inserted into the four bolt insertion holes 2b, respectively, of the airbag 2 from the inside of the airbag 2, and the airbag 2 is folded in a predetermined shape. Then, the retaining member 6A and the inflator 3 are inserted into the opening 2a of the folded airbag 2. At this time, the two fixing portions 61 of the retaining member 6A are positioned to correspond to the two bolt insertion holes 2b, respectively, of the four bolt insertion holes 2b, on the outside of the airbag 2 (on the opposite surface side relative to the surface of the airbag 2 which is in contact with the clamping member 5). Thus, the two bolts 5a of the four bolts 5a provided at the clamping member 5 are inserted into the two mounting hoes 64, respectively, of the fixing portions 61. The two bolts 5a inserted into the two mounting hoes 64, respectively, of the retaining member 6A are the two bolts 5a located on one of the diagonal lines of the square shape having the apexes which are the four bolts 5a provided at the clamping member 5.

Then, the bolts 5a are inserted into the bolt insertion holes 4c, respectively, of the mounting plate 4, and the bottom surface 32 of the inflator 3 is housed in the housing portion 4b. In this state, the nuts 5c are fastened to the bolts 5a, respectively in such a manner that the bolts 5a are inserted into the nuts 5c, respectively. In this state, the airbag 2, the retaining member 6A, and the clamping member 5 are mounted on the mounting plate 4 in a state in which the airbag 2, the retaining member 6A, and the clamping member 5 are superposed in this order from the side of the mounting plate 4. The two leg portions 62A are rotationally symmetric with respect to the center axis of the inflator 3 in a state in which the two fixing portions 61 are fixed to the mounting plate 4.

Since the airbag 2 and the retaining member 6A are fixed to the mounting plate 4 by the common fastening members (the bolts 5a), or the like, torque management for confirming whether or not the retaining member 6A is firmly fixed to the mounting plate 4 can be performed along with torque management for confirming whether or not the airbag 2 is firmly fixed to the mounting plate 4. Therefore, the number of management steps for the airbag device 1A including the retaining member 6A is not increased, with respect to the number of management steps for the conventional airbag device.

The mounting method of the airbag 2 and the retaining member 6A is not limited to this. For example, the retaining member 6A may be fixed to the mounting plate 4 independently of the airbag 2. Further, constituents other than the bolts 5a and the nuts 5c may be used as the fastening members.

The retaining member 6A is configured to retain the inflator 3 in the housing portion 4b in such a manner that the retaining member 6A is in contact with a part of the inflator 3 and is elastically deformed, in a state in which the fixing portions 61 are fixed to the mounting plate 4.

Figure 4:
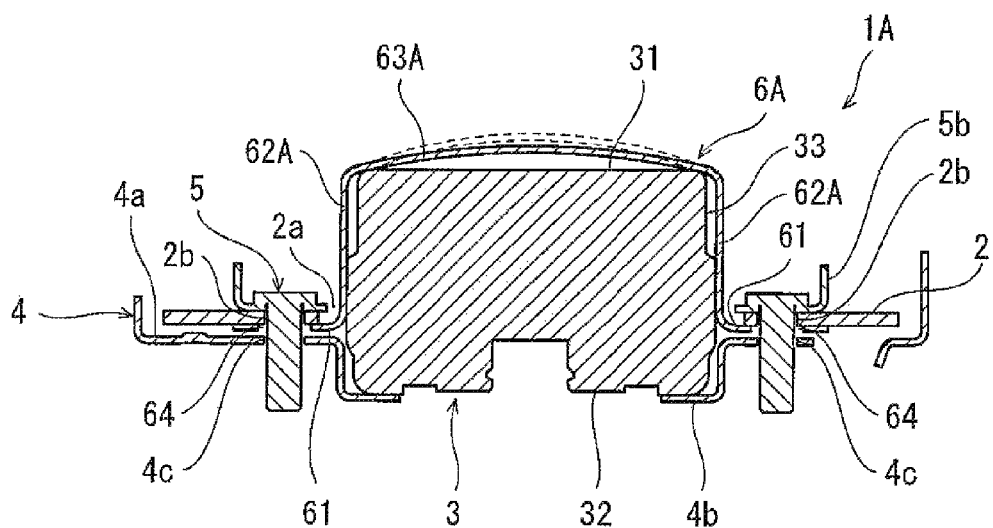
FIG. 4 is a view showing a state in which a retaining member is not fixed to a mounting plate, in the cross-sectional view of the airbag device of FIG. 2.

FIG. 4 is a view showing a state in which the retaining member 6A is not fixed to the mounting plate 4 (before the retaining member 6A is fixed to the mounting plate 4), in the cross-sectional view of the airbag device 1A of FIG. 2. In the present embodiment, in a state in which the retaining member 6A is not fixed to the mounting plate 4 (the retaining member 6A is not elastically deformed), the length in the center axis direction of the inflator 3, of the leg portions 62A of the retaining member 6A, is smaller than a distance in the center axis direction between a retaining member fixing portion (the mounting plane 4a) of the mounting plate 4, and the top surface 31 of the inflator 3, and the arm portion 63A protrudes to be away from the top surface 31 in the center axis direction. In other words, the arm portion 63A of the retaining member 6A extends to be away from the top surface 31 of the inflator 3, from the second end portions (arm portion connection side end portions) of the leg portions 62A toward the radially center portion of the inflator 3. In this configuration, as shown in FIG. 4, in a state in which the retaining member 6A, the airbag 2, and the clamping member 5 are disposed on the mounting plate 4 (the nuts 5c are not fastened to the bolts 5a, respectively), the fixing portions 61 are not in contact with the mounting plate 4, and the arm portion 63A is in contact with the top surface 31 of the inflator 3. In brief, in a state in which the nuts 5c are not fastened to the bolts 5a, respectively, there is a gap between the fixing portions 61 and the mounting plane 4a of the mounting plate 4.

After that, the nuts 5c are tightened on the bolts 5a, respectively, of the clamping member 5, and thereby the retaining member 6A is elastically deformed, starting from locations at which the arm portion 63A is in contact with the inflator 3. Specifically, the center portion of the arm portion 63A (a portion of the arm portion 63A which is in the vicinity of the radially center portion of the inflator 3) is elastically deformed to be away from the top surface 31 of the inflator 3. Further, the bolts 5a are tightened, the fixing portions 61 of the retaining member 6A come into contact with the mounting plate 4 (no gap exists), and fastening of the bolts 5a and the nuts 5c is completed, as shown in FIG. 2. As a result, the retaining member 6A is fixed to the mounting plate 4 in a state in which the retaining member 6A is elastically deformed to generate an elastic force (resilience) for pressing the inflator 3. In FIG. 4, the arm portion 63A of the retaining member 6A which is fixed to the mounting plate 4 (the retaining member 6A is elastically deformed) is indicated by a broken line.

In accordance with the above-described configuration, the retaining member 6A is fixed to the mounting plate 4 in a state in which the bottom surface 32 of the inflator 3 is supported on the housing portion 4b of the mounting plate 4, and thereby is elastically deformed. By the elastic force generated by the elastic deformation of the retaining member 6A, the inflator 3 is retained in the housing portion 4b. At this time, by the elastic deformation of the retaining member 6A, an error (difference) between a distance from the protruding portion of the arm portion 63A to the bottom surface of the housing portion 4b, and the length (height) of the inflator 3 in the center axis direction is corrected. Therefore, it becomes possible to suppress the retaining member 6A from pressing the inflator 3 excessively, while preventing a displacement of the inflator 3 with respect to the retaining member 6A and the mounting plate 4. This makes it possible to properly mount the inflator 3 on the mounting plate 4, without increasing accuracy of constituent members of the inflator 3, the retaining member 6A, and the mounting plate 4. Further, in the present embodiment, since the two leg portions 62A of the retaining member 6A are coupled to each other by the arm portion 63A, the elastic force generated by the elastic deformation of the retaining member 6A can work effectively to retain the inflator 3.

The elastic force generated by the elastic deformation of the retaining member 6A works in a direction to cause the fixing portions 61 to be away from the mounting plate 4. For this reason, each of the bolts 5a and the corresponding nut 5c can be firmly fastened to each other without applying great fastening torque, and the bolts 5a do not loose. In other words, regarding fastening of the bolt 5a and the nut 5c, a surface pressure between the thread of the bolt 5a and the thread of the nut 5c can be increased by the elastic deformation of the retaining member 6A, which can obtain the same effects as those obtained in a case where a spring washer is disposed between the bolt 5a and the nut 5c. Therefore, also in this respect, a load applied to the inflator 3 can be reduced.

In the present embodiment, the retaining member 6A is configured in such a manner that the arm portion 63A is in surface contact with the top surface 31 of the inflator 3 to generate a force applied radially inward of the inflator 3 in the leg portions 62A, and the leg portions 62A are in contact with the side surface 33 of the inflator 3 in a state in which the fixing portions 61 are fixed to the mounting plate 4. To realize this, specifically, the fixing portions 61 are independently provided at the two leg portions 62A, respectively. In other words, at least the fixing portion should be continuously with the leg portion 62A or the arm portion 63A which elastically deform. This allows the retaining member 6A to be easily elastically deformed when the retaining member 6A is fixed to the mounting plate 4. As a result, an assembling work can be easily performed.

In the above-described configuration, when each of the nuts 5c is tightened on the corresponding bolt 5a in a state in which the nut 5c is not fastened to the bolt 5a as shown in FIG. 4, a force for deforming the two leg portions 62A of the retaining member 6A to draw the leg portions 62A to each other (to cause the leg portions 62A to be close to each other) is generated, starting from locations at which the arm portion 63A is in contact with the inflator 3. With this force, the two leg portions 62A of the retaining member 6A come into contact with the side surface 33 of the inflator 3, and thereby the elastic force for pressing the side surface 33 of the inflator 3 by the leg portions 62A is generated in the retaining member 6A. As a result, the inflator 3 is retained between the two leg portions 62A of the retaining member 6A fixed to the mounting plate 4. At this time, by the elastic deformation of the retaining member 6A, an error (difference) between a distance from each of the leg portions 62A to the center axis of the inflator 3, and the radius of the inflator 3 at a location where the leg portion 62A is in contact with the inflator 3 is corrected. Since the inflator 3 is retained between the arm portion 63A of the retaining member 6A and the mounting plate 4, it becomes possible to effectively prevent a displacement of the inflator 3 in a vertical direction (center axis direction of the inflator 3) in a state in which the inflator 3 is mounted on the mounting plate 4. In addition, since the inflator 3 is retained between the two leg portions 62A of the retaining member 6A, it becomes possible to effectively prevent a displacement of the inflator 3 in a rightward and leftward direction (radial direction of the inflator 3) in a state in which the inflator 3 is mounted on the mounting plate 4.

Since the retaining member 6A is formed by bending one metal plate in the present embodiment, the retaining member 6A which is elastically deformable can be formed easily at low cost.

In the present embodiment, the mounting holes 64 formed in the fixing portions 61 to insert the bolts 5a therethrough are elongated holes whose lengthwise direction conforms to the radial direction of the inflator 3 in a state in which the retaining member 6A is fixed to the mounting plate 4. The mounting holes 64 which are the elongated holes permit the inflator 3 to be radially moved by the elastic force generated in the leg portions 62A when the nuts 5c are tightened. Therefore, the retaining member 6A can be fixed to the mounting plate 4, in a state in which an elastic force for elastically deforming the two leg portions 62A to draw the leg portions 62A to each other is properly applied to the inflator 3.

In the present embodiment, as described above, the plurality of gas discharge holes 34 of the inflator 3 are formed in a part where its diameter is smaller than the largest diameter of the side surface 33. For this reason, there is a gap formed between the part of the inflator 3 which is formed with the plurality of gas discharge holes 34 and each of the leg portions 62A of the retaining member 6A, in a state in which the retaining member 6A is fixed to the mounting plate 4. Therefore, discharge of the gas through the gas discharge holes 34 is not impeded even in a state in which the retaining member 6A is fixed to the mounting plate 4. Alternatively, depending on the case, hollow portions or air holes may be provided at locations of the leg portions 62A which face the gas discharge holes 34, to allow the gas discharged through the gas discharge holes 34 to pass therethrough.

Embodiment 2

Figure 5:
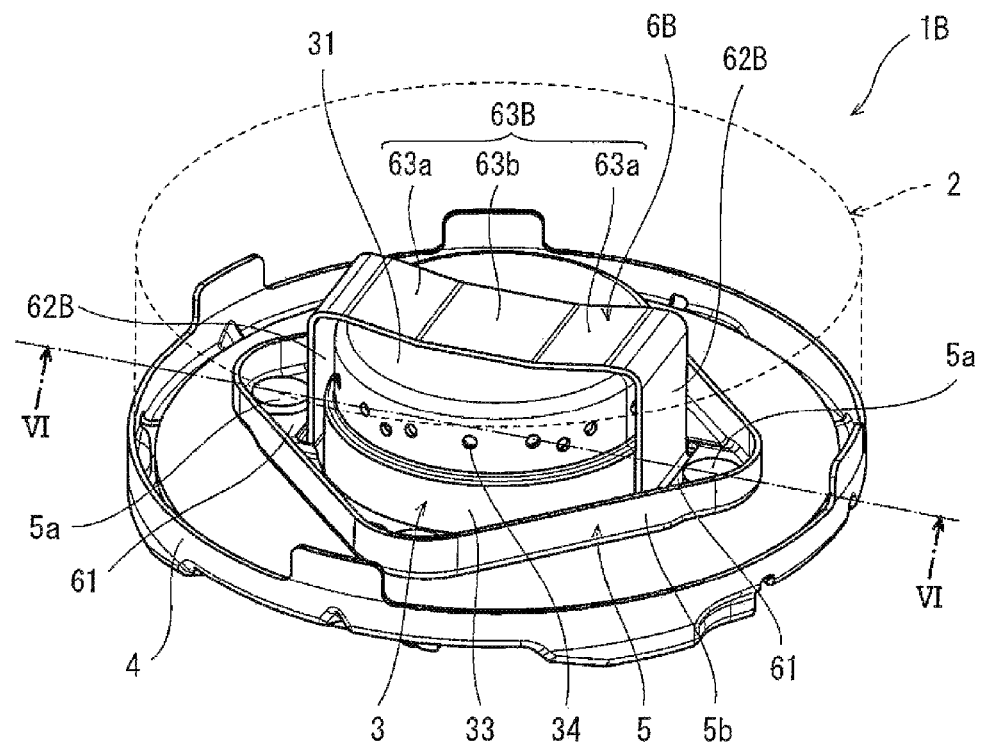
FIG. 5 is a perspective view showing the schematic configuration of an airbag device according to Embodiment 2 of the present invention.
Figure 6:
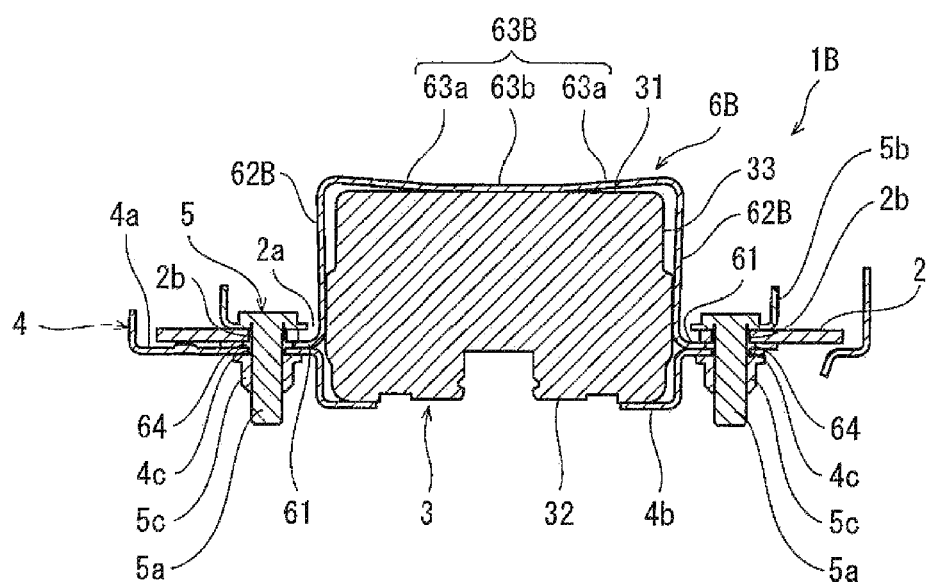
FIG. 6 is a cross-sectional view showing the airbag device of FIG. 5, taken in the direction of arrows along line VI-VI of FIG. 5.
Figure 7:
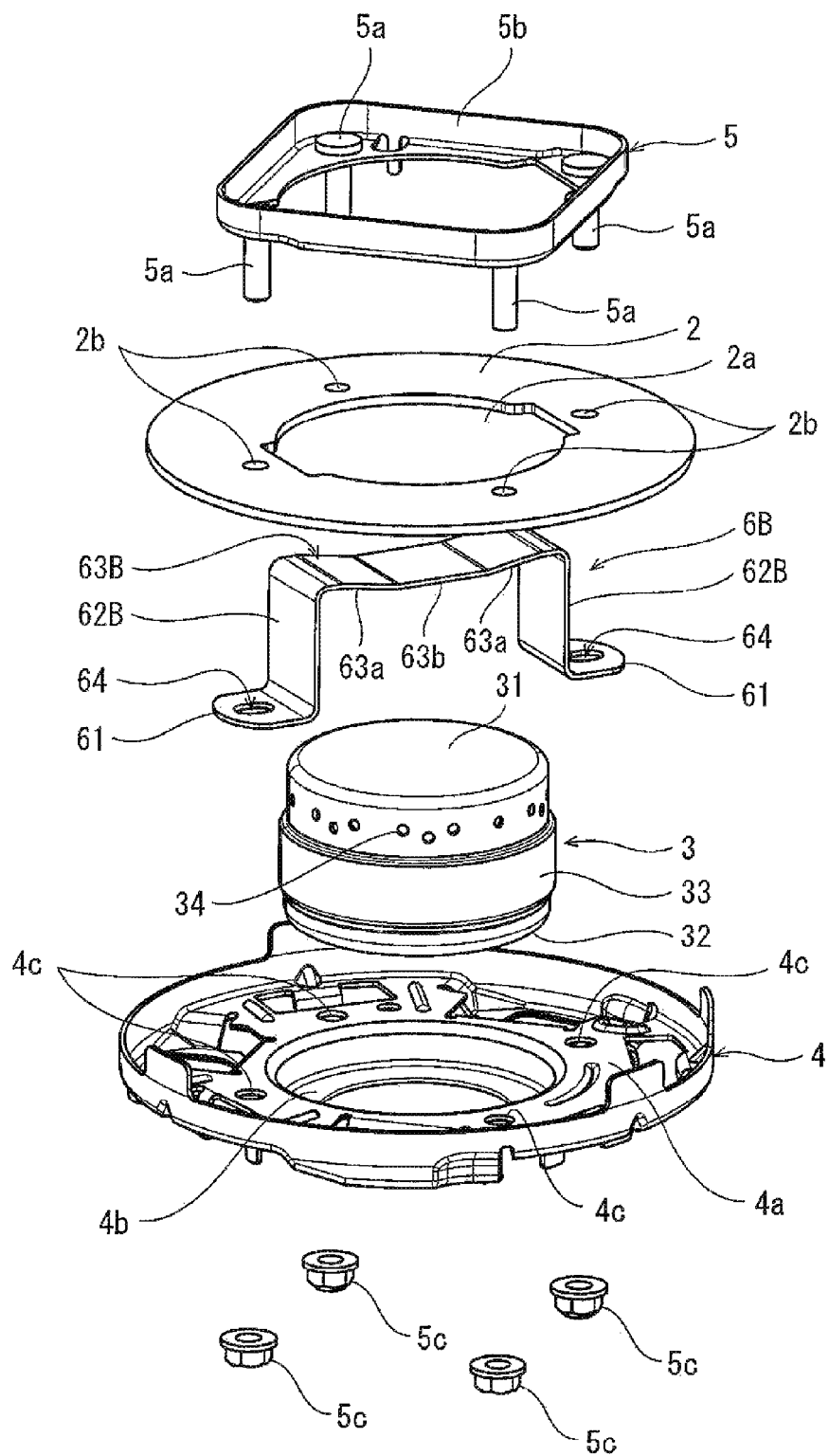
FIG. 7 is an exploded perspective view showing the airbag device of FIG. 5.

Next, Embodiment 2 of the present invention will be described. FIG. 5 is a perspective view showing the schematic configuration of an airbag device 1B according to Embodiment 2 of the present invention. FIG. 6 is a cross-sectional view showing the airbag device 1B of FIG. 5, taken in the direction of arrows along line VI-VI of FIG. 5. FIG. 7 is an exploded perspective view showing the airbag device 1B of FIG. 5. In Embodiment 2, the same constituents as those of Embodiment 1 are designated by the same reference symbols, and will not be described repeatedly.

As shown in FIGS. 5 to 7, the airbag device 1B according to the present embodiment differs from the airbag device 1A according to Embodiment 1 in that at least a part of an arm portion 63B protrudes toward the top surface 31 of the inflator 3 and the protruding portion of the arm portion 63B is in contact with the top surface 31 in a state in which the fixing portions 61 are fixed to the mounting plate 4. In the present embodiment, the arm portion 63B of the retaining member 6B includes inclined portions 63a extending to be close to the top surface 31 of the inflator 3 from the second end portions (arm portion connection side end portions) of leg portions 62B of the retaining member 6B toward the radially center portion of the inflator 3, and a coupling portion 63b for coupling the inclined portions 63a to each other. The coupling portion 63b has a flat surface shape. As in Embodiment 1, the retaining member 6B according to the present embodiment is formed by bending one metal plate.

Figure 8:
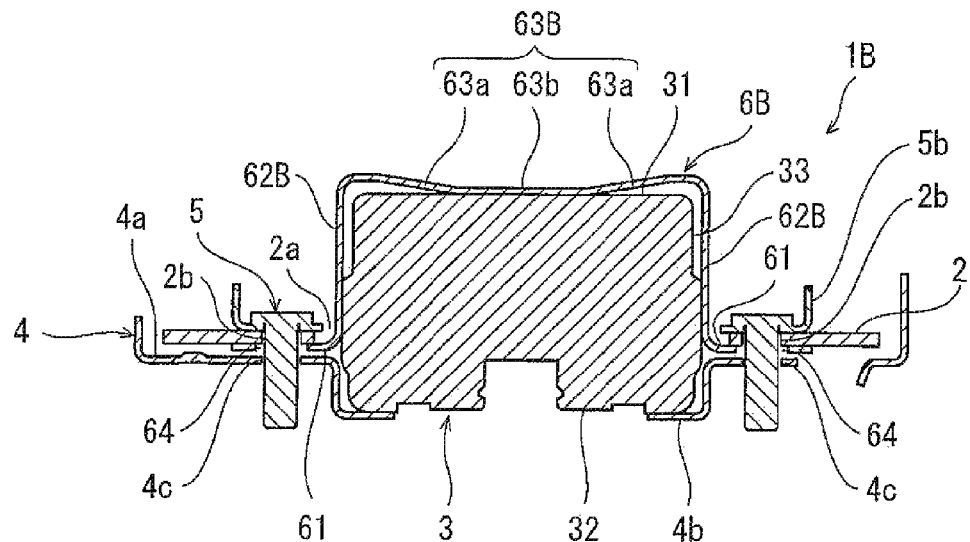
FIG. 8 is a view showing a state in which a retaining member is not fixed to a mounting plate, in the cross-sectional view of the airbag device of FIG. 6.

FIG. 8 is a view showing a state in which the retaining member 6B is not fixed to the mounting plate 4, in the cross-sectional view of the airbag device 1B of FIG. 6. As shown in FIG. 8, in the present embodiment, the length of the leg portions 62B in the center axis direction in a state in which the leg portions 62B are not elastically deformed is equal to or larger than a distance in the center axis direction between a retaining member fixing portion (mounting plane 4a) of the mounting plate 4 and the top surface 31 of the inflator 3. In addition, a distance in the center axis direction between the coupling portion 63b and the fixing portions 61 (the first end portions of the leg portions 62B) in a state in which the leg portions 62B are not elastically deformed is shorter than the distance in the center axis direction between a retaining member fixing portion (mounting plane 4a) of the mounting plate 4 and the top surface 31 of the inflator 3.

In this configuration, in a state in which the retaining member 6B, the airbag 2, and the clamping member 5 are disposed on the mounting plate 4 (in a state in which the nuts 5c are not fastened to the bolts 5a, respectively), the fixing portions 61 are not in contact with the mounting plate 4, and the coupling portion 63b of the arm portion 63B is in contact with the top surface 31 of the inflator 3.

Then, the nuts 5c are tightened on the bolts 5a, respectively, of the clamping member 5, and thereby the retaining member 6B is elastically deformed, starting from connecting portions (bent portions) of the inclined portions 63a and the coupling portion 63b at which the arm portion 63B is in contact with the inflator 3. Specifically, the retaining member 6B is elastically deformed in such a manner that inclination angles of the inclined portions 63a with respect to the coupling portion 63b are reduced. Further, the bolts 5a are tightened. As shown in FIG. 6, in a state in which the fixing portions 61 of the retaining member 6B are in contact with the mounting plate 4, fastening of the bolts 5a and the nuts 5c is completed, and an elastic force (resilience) for pressing the inflator 3 is generated in the retaining member 6B by the elastic deformation, the retaining member 6B is fixed to the mounting plate 4.

In accordance with the above-described configuration, by the elastic deformation of the retaining member 6B, the protruding portion of the arm portion 63B of the retaining member 6B presses the top surface 31 of the inflator 3, and thus, the inflator 3 is retained between the arm portion 63B of the retaining member 6B and the housing portion 4b of the mounting plate 4. At this time, by the elastic deformation of the retaining member 6B, an error (difference) between a distance from the protruding portion of the arm portion 63B to the bottom surface of the housing portion 4b, and the length (height) of the inflator 3 in the center axis direction is corrected. Therefore, it becomes possible to effectively prevent a displacement of the inflator 3 in the vertical direction (center axis direction of the inflator 3) in a state in which the inflator 3 is mounted on the mounting plate 4.

The coupling portion 63b which is in contact with the inflator 3 has a flat surface shape to be in surface contact with the top surface 31 of the inflator 3. In other words, the coupling portion 63b is disposed in parallel with the top surface 31 of the inflator 3. Since the retaining member 6B is in surface contact with the inflator 3, it becomes possible to suppress increase of a local pressing force by the retaining member 6B which is in contact with the inflator 3. In particular, as will be described later, the top surface 31 of the inflator 3 has a relatively low strength to an extent that the top surface 31 can swell when the inflator 3 is activated, compared to the other portions of the inflator 3. Thus, since the retaining member 6B is in surface contact with the top surface 31 of the inflator 3, the elastic force for firmly retaining the inflator 3 is generated in the retaining member 6B while decentralizing the pressing force applied to the top surface 31 of the inflator 3.

Further, in the present embodiment, also, the retaining member 6B is configured in such a manner that the arm portion 63B is in surface contact with the top surface 31 of the inflator 3 to generate a force applied radially inward of the inflator 3 in the leg portions 62B, and the leg portions 62B are in contact with the side surface 33 of the inflator 3 in a state in which the fixing portions 61 are fixed to the mounting plate 4. In the present embodiment, also, the mounting holes 64 formed in the fixing portions 61, respectively, to insert the bolts 5a therethrough, are elongated holes whose lengthwise direction conforms to the radial direction of the inflator 3 in a state in which the retaining member 6B is fixed to the mounting plate 4. When each of the nuts 5c is tightened on the corresponding bolt 5a in a state in which the nut 5c is not fastened to the bolt 5a as shown in FIG. 8, a force for deforming the two leg portions 62B of the retaining member 6B to draw the leg portions 62B to each other, is generated, starting from locations at which the arm portion 63B is in contact with the inflator 3. With this force, the two leg portions 62B of the retaining member 6B come into contact with the side surface 33 of the inflator 3, and thereby the retaining member 6B is elastically deformed to generate the elastic force for pressing the side surface 33 of the inflator 3 in the leg portions 62B. At this time, by the elastic deformation of the retaining member 6B, an error (difference) between a distance from each of the leg portions 62B to the center axis of the inflator 3, and the radius of the inflator 3 at a location where the leg portion 62B is in contact with the inflator 3 is corrected. Since the inflator 3 is retained between the two leg portions 62B of the retaining member 6B, it becomes possible to effectively prevent a displacement of the inflator 3 in the rightward and leftward direction (radial direction of the inflator 3), in a state in which the inflator 3 is mounted on the mounting plate 4.

The top surface 31 of the inflator 3 is configured to swell outward in the center axis direction so as to have a predetermined curved shape when the inflator 3 is activated (the gas generation agent is combusted). The arm portion 63B has a length which does not affect the formation of the predetermined curved shape of the top surface 31 of the inflator 3.

Figure 9:
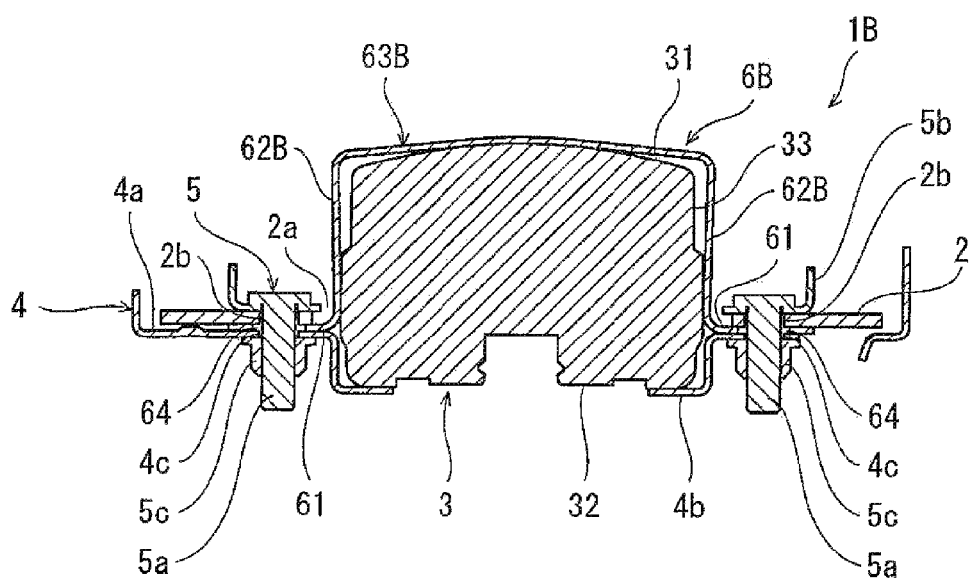
FIG. 9 is a view showing a state in which the inflator has been activated, in the cross-sectional view of the airbag device of FIG. 6.

FIG. 9 is a view showing a state in which the inflator 3 has been activated, in the cross-sectional view of the airbag device 1B of FIG. 6. As shown in FIG. 6, in a state in which the inflator 3 is not activated, the top surface 31 has a flat surface shape. As shown in FIG. 9, when the inflator 3 is activated, the shape of the top surface 31 is changed into the curved shape in which the top surface 31 swells outward in the center axis direction. Since the top surface 31 swells outward, it presses the arm portion 63b to deform the retaining member 6B. In other words, the retaining member 6B is deformed in the direction in which the inflator 3 swells outward, according to the deformation of the top surface 31. More specifically, the coupling portion 63b is deformed to protrude farther outward in the center axis direction than the second end portions (arm portion connection side end portions) of the leg portions 62B. The coupling portion 63b is deformed to protrude outward in the center axis direction so as to form the curved shape. After the deformation, the retaining member 6B may lose the elastic force (may be plastically deformed).

In this configuration, when the inflator 3 is activated, it becomes possible to prevent the arm portion 63B of the retaining member 6B from affecting a change in the shape of the top surface 31 of the inflator 3 (affecting the top surface 31 of the swollen inflator 3). This makes it possible to secure the correct actuation of the inflator 3, and continue to retain the inflator 3 by the retaining member 6B, when the inflator 3 is activated and after the inflator 3 is activated.

The phrase "the length of the arm portion 63B which does not affect the formation of the predetermined curved shape" means the adaptable length (the effective length) for the top surface 31 of the swollen inflator 3. For example, in a case where the arm portion is locally bent in a modified example which will be described later (see FIG. 17A), the length of a portion of the arm portion which is other than a portion which is not easily adaptable for the top surface 31 of the swollen inflator 3, means the adaptable length for the top surface 31 of the swollen inflator 3.

In a case where the arm portion 63A protrudes to be away from the top surface 31 of the inflator 3 in the center axis direction, as described in Embodiment 1, the length of the arm portion 63A is set to the length which does not affect the formation of the predetermined curved shape. This makes it possible to prevent the arm portion 63A of the retaining member 6A from affecting the top surface 31 of the swollen inflator 3, even when the arm portion 63A is not deformed adaptively for the top surface 31.

Embodiment 3

Figure 10:
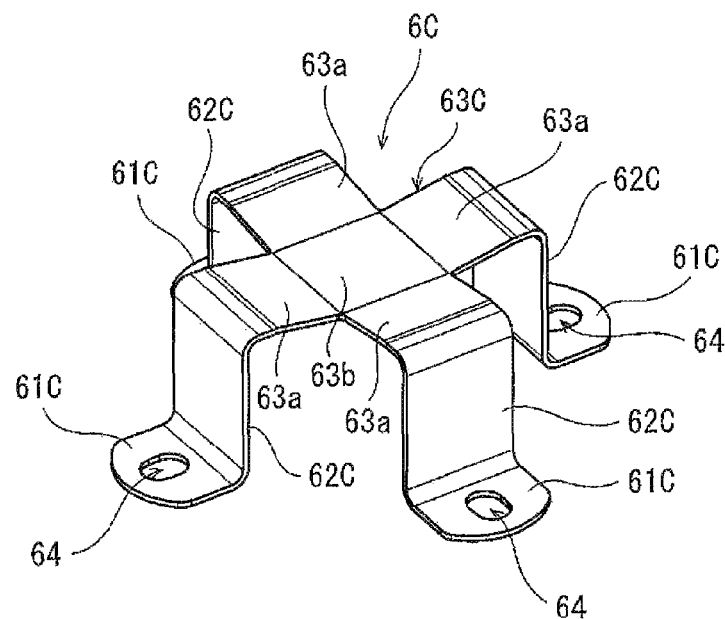
FIG. 10 is a perspective view showing a retaining member applied to an airbag device according to Embodiment 3 of the present invention.

Next, Embodiment 3 of the present invention will be described. FIG. 10 is a perspective view showing a retaining member 6C applied to an airbag device according to Embodiment 3 of the present invention. In Embodiment 3, the same constituents as those of Embodiment 2 are designated by the same reference symbols, and will not be described repeatedly.

As shown in FIG. 10, the retaining member 6C according to the present embodiment differs from the retaining member 6B according to Embodiment 2 in that four fixing portions 61C and four leg portions 62C are provided, and an arm portion 63C couples the four leg portions 62C to each other to form one retaining member 6C. In the present embodiment, also, the arm portion 63C is configured to be rotationally symmetric with respect to the center axis of the inflator 3 in a state in which the fixing portions 61C are fixed to the mounting plate 4. The arm portion 63C includes four inclined portions 63a connected to the four leg portions 62C, respectively, and one coupling portion 63b located at the center portion, and adjacent inclined portions 63a extend orthogonally to each other.

Since the arm portion 63C is rotationally symmetric with respect to the center axis of the inflator 3, the inflator 3 can be pressed uniformly by the elastic deformation of the retaining member 6C. Even in a case where a vehicle incorporating the airbag device including the retaining member 6C vibrates in many directions, the inflator 3 can be firmly retained on the mounting plate 4, and it becomes possible to prevent a displacement of the inflator 3. In addition, with an increase in the number of the leg portions 62C, the inflator 3 can be pressed more uniformly. Although in the present embodiment, the retaining member 6C including the four leg portions 62C has been described, the number of the leg portions which are rotationally symmetric may be two as described in Embodiment 1 and Embodiment 2, three, or five or more.

Embodiment 4

Figure 11:
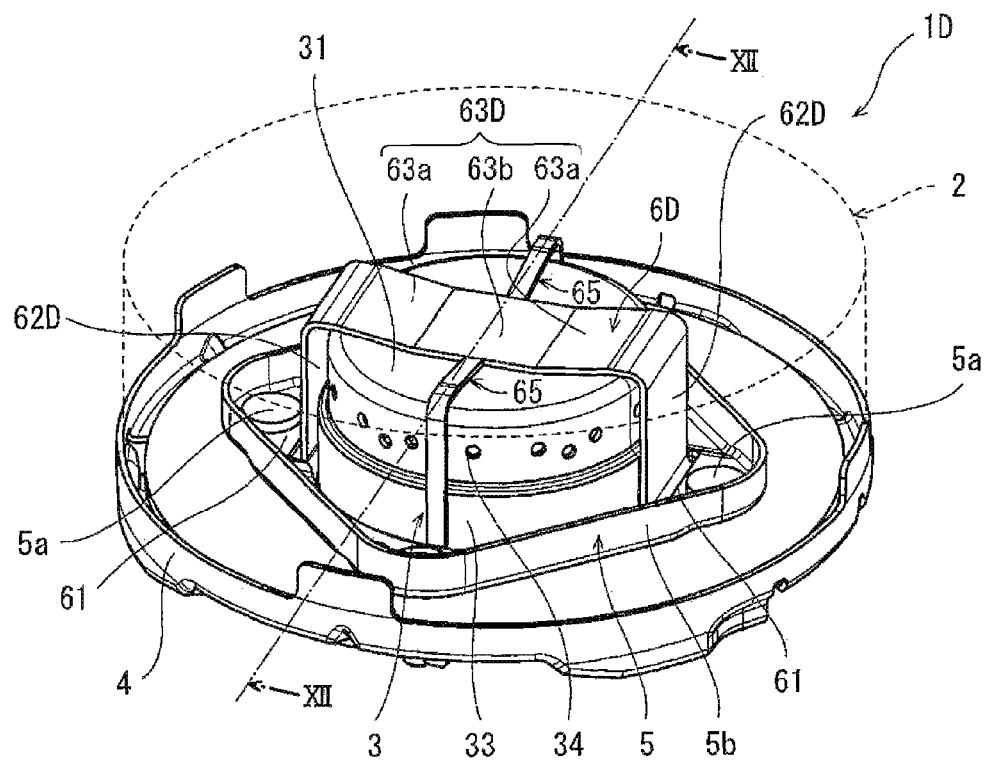
FIG. 11 is a perspective view showing the schematic configuration of an airbag device according to Embodiment 4 of the present invention.
Figure 12:
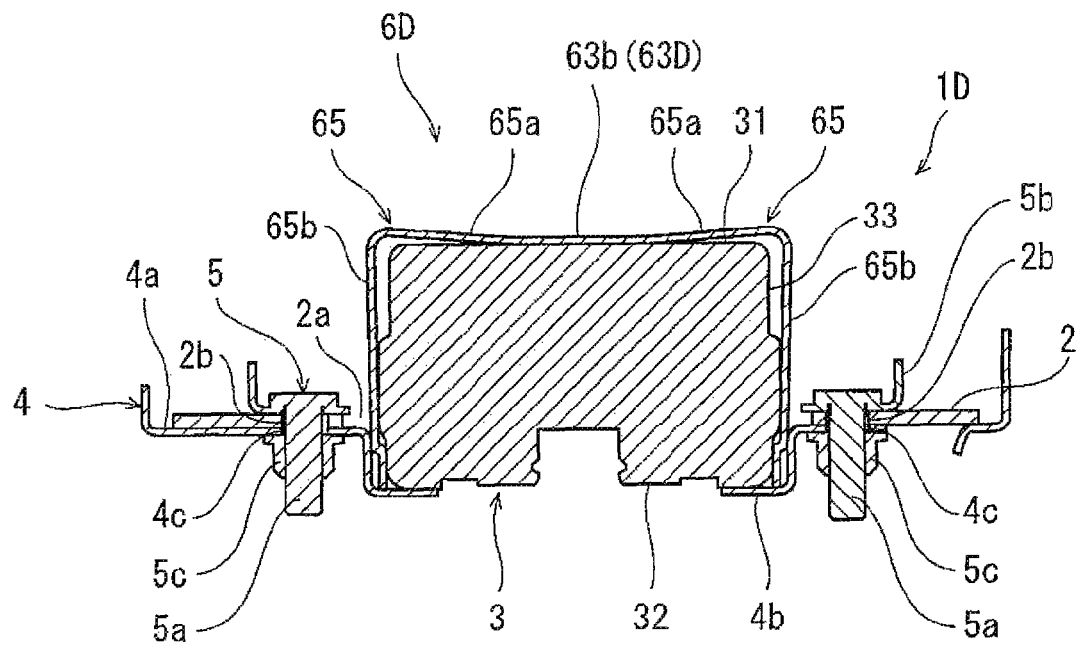
FIG. 12 is a cross-sectional view showing the airbag device of FIG. 11, taken in the direction of arrows along line XII-XII of FIG. 11.
Figure 13:
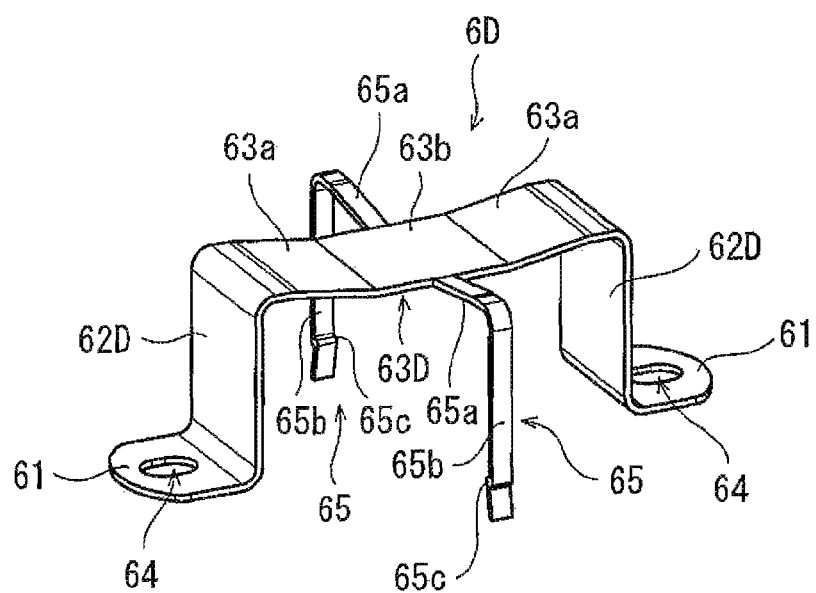
FIG. 13 is a perspective view showing a retaining member applied to the airbag device of FIG. 11.

Next, Embodiment 4 of the present invention will be described. FIG. 11 is a perspective view showing the schematic configuration of an airbag device 1D according to Embodiment 4 of the present invention. FIG. 12 is a cross-sectional view showing the airbag device 1D of FIG. 11, taken in the direction of arrows along line XII-XII of FIG. 11. FIG. 13 is a perspective view showing a retaining member 6D applied to the airbag device 1D of FIG. 11. In Embodiment 4, the same constituents as those of Embodiment 2 are designated by the same reference symbols, and will not be described repeatedly.

As shown in FIGS. 11 to 13, the airbag device 1D according to the present embodiment differs from the airbag device 1B according to Embodiment 2 in that the retaining member 6D includes insertion elements 65, the base end portions of which are connected to the intermediate portion of an arm portion 63D, and the tip end portions of which are inserted between the inner peripheral surface of the housing portion 4b and the side surface 33 of the inflator 3 in a state in which the fixing portions 61 are fixed to the mounting plate 4. In the present embodiment, each of the insertion elements 65 includes a radial extension portion 65a extending in a direction perpendicular to the extending direction of the arm portion 63D, from the center portion of the coupling portion 63b, and an axial extension portion 65b extending toward the mounting plate 4 in the center axis direction from the radially outer end portion of the radial extension portion 65a. Two insertion elements 65 are provided to opposite sides with respect to the center axis of the inflator 3.

In accordance with this configuration, the side surface 33 of the inflator 3 is retained by the insertion elements 65 as well as the leg portions 62D of the retaining member 6D. Therefore, the inflator 3 can be retained more stably.

In the present embodiment, the axial extension portions 65b are provided with bump portions 65c, respectively, in such a manner that each of the tip end portions thereof is located radially inward of the inflator 3, relative to the base end portion thereof (on the radial extension portion connection side). The bump portions 65c are positioned between the inner peripheral surface of the housing portion 4b and the side surface 33 of the inflator 3 in a state in which the fixing portions 61 are fixed to the mounting plate 4. A part of the side surface 33 of the inflator 3, which faces the inner peripheral surface of the housing portion 4b, has a diameter smaller than the largest diameter of the side surface 33. In this part, the bump portions 65c are disposed.

In this configuration, even when there is an error (difference) between the diameter of the housing portion 4b and the diameter of the bottom surface 32 of the inflator 3, it becomes possible to effectively suppress a displacement of the inflator 3 and a displacement of the housing portion 4b, because of the insertion elements 65 disposed between the housing portion 4b and the inflator 3.

A portion of each of the axial extension portions 65b which is on the tip end side relative to the bump portion 65c is inclined to be located radially outward as it extends toward the tip end. The radial extension portions 65a are inclined as in the inclined portions 63a of the arm portion 63D. In this configuration, the insertion elements 65 are elastically deformed as in the retaining member 6D, when the retaining member 6D is fixed to the mounting plate 4. Since an elastic force applied radially inward of the inflator 3 is generated in the axial extension portions 65b by the elastic deformation of the insertion elements 65, the entire portions of the axial extension portions 65b which are on the tip end side relative to the bump portions 65c are easily in surface contact with the side surface 33 of the inflator 3. Therefore, the elastic force generated in the insertion elements 65 can effectively work to retain the inflator 3.

In an alternative configuration, the radial extension portions 65a may be coplanar with the coupling portion 63b (are not inclined with respect to the coupling portion 63b), and the axial extension portions 65b may not contact the bottom surface of the housing portion 4b until at least the fixing portions 61 of the retaining member 6D are mounted on the mounting plate 4 (tightening of the nuts 5c is completed).

In the present embodiment, the insertion elements 65 have a width smaller than that of the leg portions 62D (and the arm portion 63D). This allows the insertion elements 65 to be easily inserted between the inner peripheral surface of the housing portion 4b and the side surface 33 of the inflator 3. In an alternative configuration, the width of the insertion elements 65 may be equal to or larger than that of the leg portions 62D.

Although in the present embodiment, each of the insertion elements 65 entirely has a substantially equal thickness, the portions of the insertion elements 65 which are on the tip end side relative to the bump portions 65c may have a thickness that is gradually reduced toward the tip end.

Further, the number of the insertion elements 65 is not limited to two and may be one, or three or more.

Embodiment 5

Figure 14:
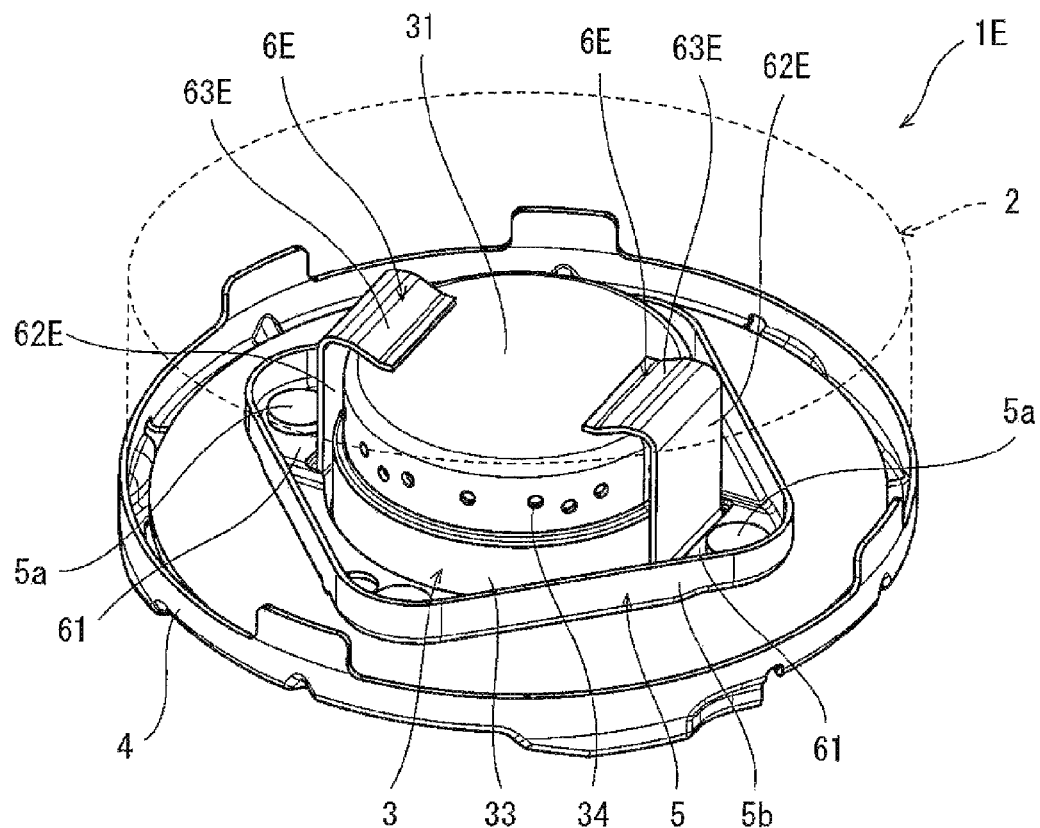
FIG. 14 is a perspective view showing the schematic configuration of an airbag device according to Embodiment 5 of the present invention.
Figure 15:
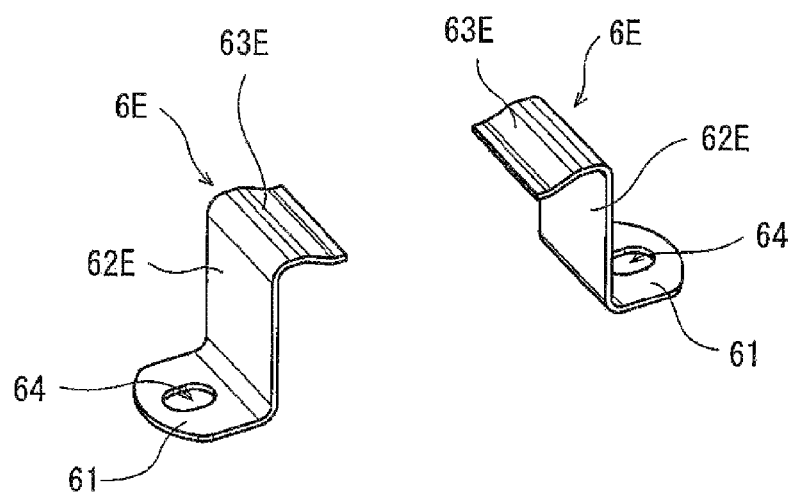
FIG. 15 is a perspective view showing retaining members applied to the airbag device of FIG. 14.

Next, Embodiment 5 of the present invention will be described. FIG. 14 is a perspective view showing the schematic configuration of an airbag device 1E according to Embodiment 5 of the present invention. FIG. 15 is a perspective view showing retaining members 6E applied to the airbag device 1E of FIG. 14. In Embodiment 5, the same constituents as those of Embodiment 2 are designated by the same reference symbols, and will not be described repeatedly.

As shown in FIGS. 14 and 15, the airbag device 1E according to the present embodiment differs from the airbag device 1B according to Embodiment 2 in that arm portions 63E of the retaining members 6E do not couple two leg portions 62E to each other. Specifically, the airbag device 1E according to the present embodiment includes two retaining members 6E which are independently provided and each of which includes the fixing portion 61, the leg portion 62E, and the arm portion 63E.

In the present embodiment, each of the arm portions 63E extends to be closer to the top surface 31 of the inflator 3 as it extends from the second end portion (arm portion connection side end portion) of the leg portion 62E toward the radially center portion of the inflator 3. In other words, each of the arm portions 63E includes the inclined portion 63a of the arm portion 63B of Embodiment 2 and does not include the coupling portion 63b of Embodiment 2. In this configuration, each of the arm portions 63E protrudes toward the top surface 31 of the inflator 3.

Therefore, as in Embodiment 2, in the present embodiment, the protruding portion of each of the arm portions 63E is in contact with the top surface 31 and each of the retaining members 6E is elastically deformed. In this way, the protruding portion of the arm portion 63E of each of the retaining members 6E presses the top surface 31 of the inflator 3. This allows the inflator 3 to be retained between the arm portions 63E of the retaining members 6E and the housing portion 4b of the mounting plate 4. Therefore, it becomes possible to effectively prevent a displacement of the inflator 3 in the vertical direction (center axis direction of the inflator 3) in a state in which the inflator 3 is mounted on the mounting plate 4.

In the present embodiment, also, the retaining members 6E are configured in such a manner that the arm portions 63E are in surface contact with the top surface 31 of the inflator 3 to generate an elastic force applied radially inward of the inflator 3 in the leg portions 62E, and the leg portions 62E are in contact with the side surface 33 of the inflator 3 in a state in which the fixing portions 61 are fixed to the mounting plate 4. This allows the inflator 3 to be retained between the leg portions 62E of the two retaining members 6E. Therefore, it becomes possible to effectively prevent a displacement of the inflator 3 in the rightward and leftward direction (radial direction of the inflator 3), in a state in which the inflator 3 is mounted on the mounting plate 4. In the present embodiment, also, the mounting holes 64 formed in the fixing portions 61 to insert the bolts 5a therethrough are elongated holes whose lengthwise direction conforms to the radial direction of the inflator 3 in a state in which the retaining member 6E is fixed to the mounting plate 4.

In the present embodiment, also, the tip end portions (radially inward end portions) of the arm portions 63E which are the protruding portions of the retaining members 6E have a flat surface shape so as to be in surface contact with the top surface 31 of the inflator 3. In other words, the tip end portions of the arm portions 63E are disposed in parallel with the top surface 31 of the inflator 3. In this configuration, as in Embodiment 2, the retaining members 6E are in surface contact with the inflator 3. Therefore, it becomes possible to more effectively suppress a local increase in a pressing force applied by the retaining members 6E which are in contact with the inflator 3.

Although in the present embodiment, the two retaining members 6E are used to retain the inflator 3, one, or three or more retaining members 6E may be used to retain the inflator 3. In a case where two or more retaining members 6E are used to retain the inflator 3, the arm portions 63E are disposed to be rotationally symmetric with respect to the center axis of the inflator 3, and thus the inflator 3 can be pressed uniformly by the elastic deformation of the retaining members 6E, as in Embodiment 3.

Embodiment 6

Figure 16A:
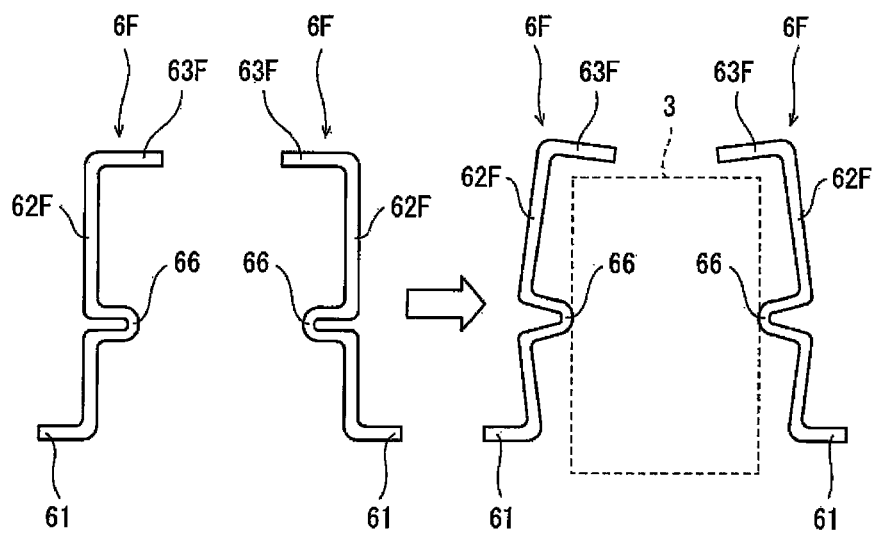
FIGS. 16A and 16B are side views each showing an example of the schematic configuration of retaining members applied to an airbag device according to Embodiment 6 of the present invention.
Figure 16B:
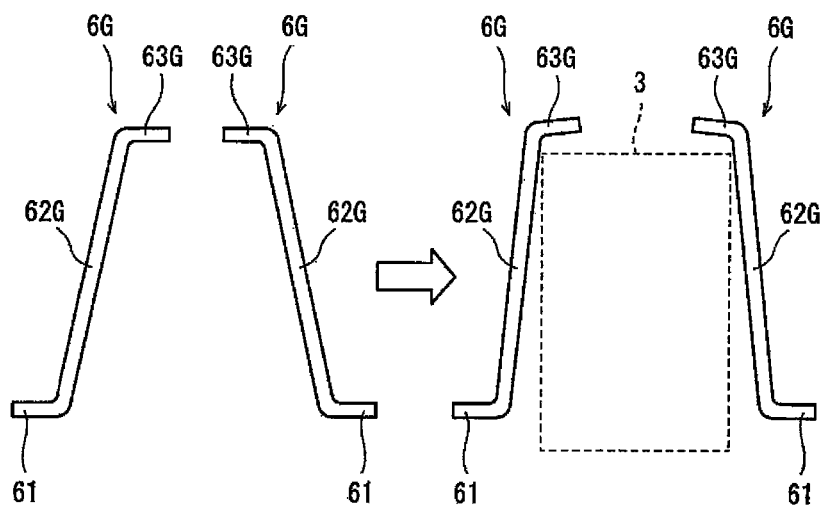

Next, Embodiment 6 of the present invention will be described. FIGS. 16A and 16B are side views showing the schematic configurations of retaining members 6F, 6G applied to an airbag device according to Embodiment 6 of the present invention. In Embodiment 6, the same constituents as those of Embodiment 5 are designated by the same reference symbols, and will not be described repeatedly.

As shown in FIGS. 16A and 16B, the retaining members 6F, 6G according to the present embodiment differ from the retaining member 6E according to Embodiment 5 in that arm portions 63F, 63G do not contact the inflator 3 and a part of leg portions 62F, 62G contact the inflator 3. More specifically, at least a part of the leg portions 62F and at least a part of the leg portions 62G protrude toward the side surface 33 of the inflator 3. The protruding portions of the leg portions 62F and the protruding portions of the leg portions 62G are configured to contact the side surface 33 of the inflator 3 in a state in which the fixing portions 61 are fixed to the mounting plate 4.

Initially, the example of FIG. 16A will be described. The leg portion 62F of each of the retaining members 6F in the present example is provided with a bent portion 66 which is formed by locally bending the leg portion 62F and protrudes toward the side surface 33 of the inflator 3. In the present example, the two retaining members 6F having the same shape are disposed to radially face each other (on radially opposite positions) with respect to the center axis of the inflator 3. In this configuration, the two bent portions 66 contact the side surface 33 of the inflator 3, at the same positions (heights) in the center axis direction of the inflator 3.

As shown in the left diagram of FIG. 16A, the leg portions 62F entirely have a substantially linear shape except for the bent portions 66, in a state in which the retaining members 6F are not mounted on the mounting plate 4 (the leg portions 62F are not elastically deformed). In a state in which the leg portions 62F are not elastically deformed, and the fixing portions 61 of the two retaining members 6F having the same shape are mounted on the mounting plate 4, a distance between the two bent portions 66 is shorter than the diameter of the inflator 3 at locations where the bent portions 66 are in contact with the inflator 3.

In this configuration, as shown in the right diagram of FIG. 16A, when the fixing portions 61 are fixed to the mounting plate 4, the retaining members 6F are elastically deformed, starting from the locations where the bent portions 66 are in contact with the inflator 3. More specifically, the leg portions 62F are elastically deformed so as to move radially outward of the inflator 3 around the bent portions 66. By an elastic force (resilience) for returning the bent portions 66 to a state in which the leg portions 62F are not elastically deformed, the bent portions 66 press the side surface 33 of the inflator 3.

In accordance with this configuration, by the elastic deformation of the retaining members 6F, the protruding portions (the bent portions 66) provided at the leg portions 62F of the retaining members 6F press the side surface 33 of the inflator 3, and thus, the inflator 3 is retained between the two leg portions 62F of the retaining members 6F. Therefore, it becomes possible to effectively prevent a displacement of the inflator 3 in the rightward and leftward direction (radial direction of the inflator 3), in a state in which the inflator 3 is mounted on the mounting plate 4.

The leg portions 62G of the retaining members 6G in the example of FIG. 16B are inclined to be located radially inward of the inflator 3 as the leg portions 62G extend from the fixing portions 61 toward the center axis of the inflator 3, in a state in which the leg portions 62G are not elastically deformed as shown in the left diagram of FIG. 16B. In the present example, also, the two retaining members 6G having the same shape are disposed to radially face each other (at radially opposite positions) with respect to the center axis of the inflator 3. In a state in which the fixing portions 61 of the two retaining members 6G having the same shape are mounted on the mounting plate 4 and the leg portions 62G are not elastically deformed, a distance between at least portions of the leg portions 62G which face the side surface 33 of the inflator 3 is shorter than the diameter of the side surface 33 of the inflator 3 which faces the portions of the leg portions 62G.

In this configuration, as shown in the right diagram of FIG. 16B, when the fixing portions 61 are fixed to the mounting plate 4, the portions of the leg portions 62G which are on the arm portions 63G side (the portions which are closer to the arm portions 63G) come into contact with the side surface 33 of the inflator 3, and the retaining members 6G are elastically deformed starting from the contact portions. More specifically, the retaining members 6G are elastically deformed in such a manner that a distance between the second end portions (arm portion connection side end portions) of the leg portions 62G is increased. By an elastic force (resilience) for returning the leg portions 62G to a state in which the leg portions 62G are not elastically deformed, the portions of the leg portions 62G which are in contact with the inflator 3 press the side surface 33 of the inflator 3. Therefore, as in the example of FIG. 16A, in the present example, it becomes possible to effectively prevent a displacement of the inflator 3 in the rightward and leftward direction (radial direction of the inflator 3), in a state in which the inflator 3 is mounted on the mounting plate 4.

Although in the present embodiment, the arm portions 63F, 63G do not contact the top surface 31 of the inflator 3, the arm portions 63F, 63G may be configured to contact the top surface 31 of the inflator 3 by the elastic deformation of the leg portions 62F, 62G This makes it possible to effectively prevent a displacement of the inflator 3 in the vertical direction and in the rightward and leftward direction, in a state in which the inflator 3 is mounted on the mounting plate 4.

Although in the present embodiment, the arm portions 63F are not coupled to each other (the two retaining members 6F are independently provided) and the arm portions 63G are not coupled to each other (the two retaining members 6G are independently provided), the arm portions 63F may be coupled to each other and the arm portions 63G may be coupled to each other as described in Embodiment 1 to Embodiment 4. Further, the number of the leg portions 62F and the number of the leg portions 62G are not limited to two, and may be three or more.

Although in the present embodiment, the leg portions 62F facing each other are in contact with the side surface 33 of the inflator 3 at substantially the same position (height) in the center axis direction of the inflator 3 and the leg portions 62G facing each other are in contact with the side surface 33 of the inflator 3 at substantially the same position (height) in the center axis direction, the leg portions facing each other may be in contact with the side surface 33 of the inflator 3 at different positions (heights) in the center axis direction. For example, in the example of FIG. 16A, the bent portion 66 of one of the two leg portions 62F may be located to be closer to the first end portion (fixing portion connection side end portion), while the bent portion 66 of the other of the two leg portions 62F may be located to be closer to the second end portion (arm portion connection side end portion).

Other Modified Examples

Although the embodiments of the present invention have been described, the present invention is not limited to the above-described embodiments, and may be improved, changed or modified in various ways within the scope of the present invention. For example, the constituents of the above-described plurality of embodiments may be combined as desired.

Although in the above-described embodiments, the structure of the retaining member 6x (x=A to G) is exemplarily described, this is merely exemplary, and other structures may be used so long as the inflator 3 can be retained in the housing portion 4b by the elastic force generated by the elastic deformation of the retaining member fixed to the mounting plate 4. Although the configurations of the above-described Embodiment 1 to Embodiment 5 are exemplarily described as the retaining member which is in contact with the top surface 31 of the inflator 3 and thereby is elastically deformed, the following configurations may alternatively be used.

Figure 17A:
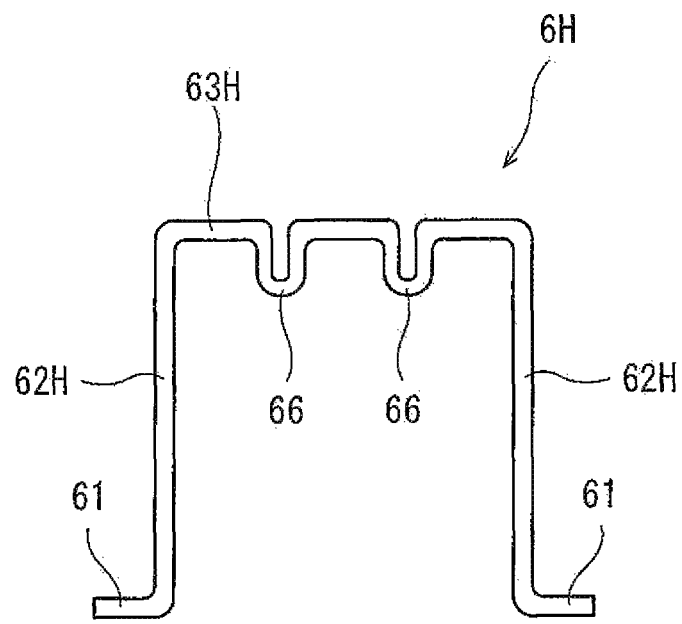
FIGS. 17A and 17B are side views showing other examples of the retaining member which is in contact with the top surface of the inflator.
Figure 17B:
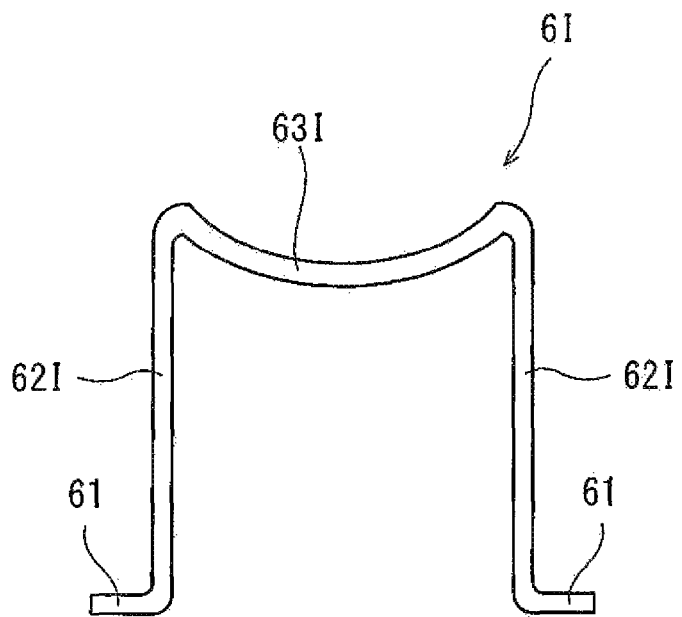

FIGS. 17A and 17B are side views showing other examples of the retaining member which is in contact with the top surface 31 of the inflator 3. In the example of FIG. 17A, a retaining member 6H has an arm portion 63H which couples two leg portions 62H to each other and is provided with bent portions 66 which are formed by locally bending the arm portion 63H and protrude toward the top surface 31 of the inflator 3. In the present example, as in Embodiment 1 and others, the fixing portions 61 are not in contact with the mounting plate 4, and the bent portions 66 provided at the arm portion 63H are in contact with the top surface 31 of the inflator 3, in a state in which the retaining member 6H, the airbag 2, and the clamping member 5 are disposed on the mounting plate 4 (in a state in which the nuts 5c are not fastened to the bolts 5a, respectively).

By tightening the nuts 5c, the elastic deformation generated in the leg portions 62F with respect to the side surface 33 of the inflator 3 in the example of FIG. 16A is generated in the arm portion 63H with respect to the top surface 31 of the inflator 3 in the present example. Thereby, the elastic deformation similar to that of Embodiment 1 and others is generated in the retaining member 6H to retain the inflator 3.

In the example of FIG. 17B, a retaining member 6I includes an arm portion 63I for coupling two leg portions 62I to each other, and the arm portion 63I is entirely curved to protrude toward the top surface 31 of the inflator 3. In the present example, as described in Embodiment 2, the center portion of the arm portion 63I is in contact with the top surface 31 of the inflator 3. This allows a similar elastic force to be generated in the retaining member 6I to retain the inflator 3.

Although in the above-described embodiments, the first end portions (fixing portion connection side end portions) of the leg portions 62x (x=A to G) are not coupled to each other and are independent of each other, the first end portions of the leg portions 62x may be coupled to each other. For example, in Embodiment 1, the retaining member 6A may be integrated with the plate member 5b of the clamping member 5 by, for example, welding or integral molding.

In the above-described Embodiments 1 to 5, the retaining member 6y (y=A to E) is configured to contact the side surface 33 of the inflator 3 as well as the top surface 31 of the inflator 3 to retain the inflator 3 in the vertical direction (the center axis direction) and in the rightward and leftward direction (the radial direction). Alternatively, for example, in a case where a manufacturing error between a distance from one of the leg portions 62y to the other and the diameter of the inflator 3 can be reduced, the retaining member 6y may be configured to contact only the top surface 31 of the inflator 3.

Although in the above-described embodiments, the retaining member 6x is substantially entirely elastically deformable, a part of the retaining member 6x may not be easily elastically deformable. For example, the leg portions 62x may have a curved shape conforming to the curved surface of the side surface 33 of the inflator 3. Further, the leg portions 62x may have a cylindrical shape. In this case, the inflator 3 may be housed in the inside of the cylindrical leg portions 62x.

The retaining member 6x of the above-described embodiments is applicable to an airbag device including the cylindrical inflator 3, such as an airbag device for a driver seat or an airbag device for a passenger seat.

The airbag device of the present invention is useful in properly mounting an inflator without increasing accuracy of constituent members.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. An airbag device comprising:
an airbag having an opening;
a cylindrical inflator;
a mounting plate which has a mounting plane on which the airbag is mounted and supports the inflator in such a manner that a center axis of the inflator is perpendicular to the mounting plane to insert at least a part of the inflator into the airbag through the opening, in a state in which the airbag is mounted on the mounting plane; and
a retaining member which is fixed to the mounting plate and is elastically deformable,
wherein the mounting plate includes a housing portion which houses therein a part of the inflator,
wherein the inflator has a bottom surface disposed to be close to the housing portion, a top surface opposite to the bottom surface, and a side surface provided continuously with the bottom surface and the top surface,
wherein the retaining member includes:
a fixing portion fixed to the mounting plate at a location that is radially outward relative to the side surface of the inflator,
a leg portion which has a first end portion provided continuously with the fixing portion, and a second end portion, and extends from the first end portion toward the top surface of the inflator in a center axis direction of the inflator, and
an arm portion extending radially inward relative to the side surface of the inflator from the second end portion of the leg portion, and
wherein the retaining member is in contact with a part of the inflator and is elastically deformed to generate an elastic force for pressing the inflator to retain the inflator in the housing portion of the mounting plate, in a state in which the fixing portion is fixed to the mounting plate.

2. The airbag device according to claim 1,
wherein at least a part of the arm portion of the retaining member protrudes toward the top surface of the inflator, and a protruding portion of the arm portion is in contact with the top surface of the inflator in a state in which the fixing portion of the retaining member is fixed to the mounting plate.

3. The airbag device according to claim 2,
wherein the protruding portion of the arm portion has a flat surface shape to be in surface contact with the top surface of the inflator.

4. The airbag device according to claim 1,
wherein the leg portion includes at least two leg portions, and the leg portions are coupled to each other by the arm portion.

5. The airbag device according to claim 4,
wherein the top surface of the inflator is configured to swell outward in the center axis direction of the inflator so as to have a predetermined curved shape when the inflator is activated, and
wherein the arm portion has a length which does not affect formation of the predetermined curved shape.

6. The airbag device according to claim 1,
wherein the leg portion includes at least two leg portions, and the fixing portion includes fixing portions independently provided at the leg portions, respectively.

7. The airbag device according to claim 1,
wherein the leg portion includes at least two leg portions, and the fixing portion includes fixing portions provided at the leg portions, respectively,
wherein the arm portion of the retaining member is configured to contact the top surface of the inflator to cause a force applied radially inward of the inflator to be generated in the leg portions, and
wherein the leg portions are configured to contact the side surface of the inflator in a state in which the fixing portions are fixed to the mounting plate.

* * * * *